Sept. 20, 1960 E. G. ANDERSON 2,953,394
OCCUPANT PROPELLED GYRAL WHEEL
Filed Feb. 6, 1958
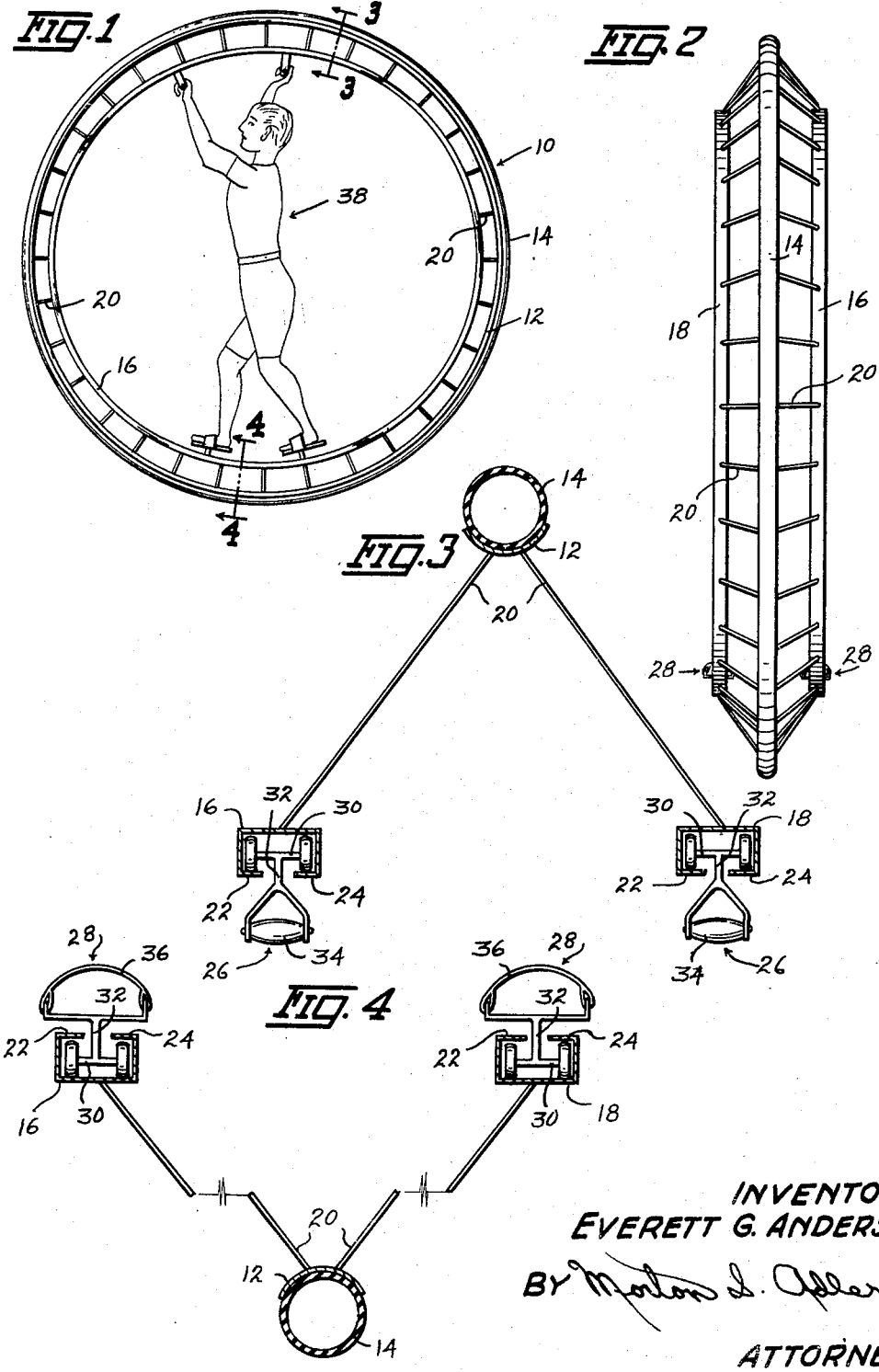
INVENTOR.
EVERETT G. ANDERSON
BY Morton S. Adler
ATTORNEY.

United States Patent Office 2,953,394
Patented Sept. 20, 1960

2,953,394

OCCUPANT PROPELLED GYRAL WHEEL

Everett G. Anderson, Sioux City, Iowa
(West Branch, Iowa)

Filed Feb. 6, 1958, Ser. No. 713,737

5 Claims. (Cl. 280—207)

My invention relates to what I refer to as a gyral wheel that is designed for use as entertainment and for exercise by both children and adults.

One of the important objects contemplated by this invention is the provision of an occupant propelled vehicle having a single ground engaging wheel and novel means by which the occupant can propel the same.

More particularly this invention includes a single ground engaging wheel having a pair of elliptical frames mounted thereto which provide means for supporting an occupant and for facilitating propulsion of the vehicle.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a side elevational view of this invention,

Fig. 2 is an enlarged end elevational view thereof, and,

Figs. 3 and 4 are respective enlarged cross sectional views taken on the respective lines 3—3 and 4—4 of Fig. 1.

Referring to the drawings an open center ground engaging wheel is designated generally by the number 10 and includes a rim 12 on which is mounted a tire 14 similar to those used on bicycles. At respective opposite sides of wheel 10 there are disposed the elliptical parallel frame members 16 and 18 which are secured to rim 12 for rotation therewith by a plurality of bracing rods or spokes 20. Frames 16 and 18 are of like construction being channel shape in cross section as shown in Figs. 3 and 4 and provided with spaced tracks 22 and 24 coextensive with their respective inner edge.

On each frame 16 and 18 is mounted a hand grip and foot saddle represented generally by the respective numerals 26 and 28 as shown in Figs. 3 and 4. Each member 26 and 28 is rollably disposed within the respective channels 16 and 18 by a roller assembly 30 moving on tracks 22 and 24. A rigid link 32 extends from each roller assembly 30 between tracks 22 and 24 toward the center of wheel 10 and for members 26 carries a handle 34 for manual gripping as will later appear. For members 28, link 32 terminates in any suitable fastening means 36 by which the foot of an occupant can be detachably secured thereto.

In using this vehicle, an occupant, indicated for illustration at 38, will be in an upright standing position and will maintain such position while propelling the wheel 10. With such wheel righted for use as shown in Figs. 1 and 2, the hand grip members 26 on the elliptical frames 16 and 18 are moved to the top or overhead position relative to the occupant, and the occupant grasps one respective handle 34 in each hand. The foot saddles 28 are moved to the bottom of the wheel 10 and due to their rolling engagement with frames 16 and 18 will usually assume this position by gravity when wheel 10 is righted.

The occupant then preferably engages one foot in one of the foot saddles 28, uses the other to start wheel 10 rolling by pushing against the ground and then engages such other foot in the other saddle 28.

As wheel 10 rotates, the elliptical frames 16 and 18 being secured thereto by spokes 20 also rotate, and the occupant by shifting his weight from leg to leg and moving both arms and legs in piston like fashion in various degrees of synchronization as will become apparent to him will cause the wheel 10 to be propelled. Members 26 and 28 will remain substantially diametrically disposed due to their rollable engagement in channels 16 and 18 and the manipulations by the occupant. As wheel 10 rotates the occupant becomes in effect an axis connected in a vertical plane across the vehicle by extensible and retractable connecting means represented by his arms and legs. Thus as the elliptical frames 16 and 18 also rotate with wheel 10, portions of such frames will alternately move closer to and farther from the axis relative to a direct line between the opposite connecting points represented by members 26 and 28. To accommodate for such differences in distance, the occupant will move his legs and arm in short piston-like strokes as described and by suitable practice will be able to propel the vehicle for his enjoyment, sport and exercise.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. An occupant propelled vehicle, comprising a single open center ground engaging wheel, an elliptical frame on each respective side of said wheel and secured to said wheel for rotation therewith, said frames being channel shaped in cross section and provided with track means co-extensive with their inner side, a pair of roller assemblies rollably disposed in each track, one of said roller assemblies on each track carrying a hand grip member, and the other on each track carrying a foot engaging member.

2. An occupant propelled vehicle, consisting of a single open center ground engaging wheel, an elliptical frame on each respective side of said wheel and secured to said wheel for rotation therewith, a pair of roller assemblies rollably mounted on each frame, one of said roller assemblies on each frame carrying a hand grip member, the other on each frame carrying a foot engaging member, said roller assemblies constructed and arranged so that said hand grip members will remain substantially diametrically disposed to said foot engaging members during rotation of said wheel by virtue of their engagement by the occupant who will define a vertically disposed axis to which said hand grip and foot engaging members are extensibly and retractably connected by virtue of the required piston like movements of the occupant's hands and legs as portions of the elliptical frame alternately move closer to and farther away from the axis of said frame relative to a direct line between the respective opposite points of said hand grip and foot engaging members.

3. An occupant propelled vehicle, consisting of a single open center ground engaging wheel, an elliptical frame on each respective side of said wheel and secured to said wheel for rotation therewith, a respective hand and foot engaging member rollably mounted on each elliptical frame designed to be engaged respectively by the hands and feet of the occupant and to be maintained thereby during rotation of said wheel at substantially diametrically disposed points relative to a vertical plane, the occupant defining a vertically disposed axis during rotation of said wheel with his hands and feet serving as piston-like connections to the respective hand and foot engaging members, and said vehicle being propelled by the shifting of the occupant's weight from leg to leg and the piston like movements of his arms and legs in respective diametrically opposed directions as said elliptical frame rotates and said hand grip and foot engaging members alternately move closer to and farther from the axis of said frame relative to a direct line between said members.

4. An occupant propelled vehicle, consisting of a single open center ground engaging wheel, an elliptical frame on each respective side of said wheel and secured to said wheel for rotation therewith, a respective hand and foot engaging member rollably mounted on each elliptical frame and adapted to be maintained in substantially diametrically opposed relationship by the occupant who will define a vertically disposed axis during rotation of said wheel and propulsion of said wheel being obtained by the alternate application of force to said respective hand and foot engaging members by the piston-like movements of the occupant's legs and arms toward and away from the axis of said elliptical frame.

5. An occupant propelled vehicle, comprising an open center ground engaging wheel, an elliptical track means secured to said wheel for rotation therewith, respective hand and foot engaging members rollably mounted on said track means and adapted to be maintained in substantially diametrically opposed relationship by the occupant who will define a vertically disposed axis during rotation of said wheel and propulsion of said wheel being obtained by the alternate application of force to said respective hand and foot engaging members by the piston-like movements of the occupant's legs and arms toward and away from the axis of said elliptical frame.

References Cited in the file of this patent

UNITED STATES PATENTS

| | | |
|---|---|---|
| 91,734 | Frazer et al. | June 22, 1869 |
| 97,411 | Johnson | Nov. 30, 1869 |
| 511,139 | Harper | Dec. 19, 1893 |
| 1,673,774 | Moore | June 12, 1928 |
| 2,001,205 | Marten | May 14, 1935 |

FOREIGN PATENTS

| | | |
|---|---|---|
| 573,225 | France | Mar. 6, 1924 |